United States Patent [19]
Mohon

[11] 3,936,871
[45] Feb. 3, 1976

[54] MULTI-WAVELENGTH DISPLAY SYSTEM
[75] Inventor: Windell N. Mohon, Winter Park, Fla.
[73] Assignee: The United States of America as represented by the Secretary of the Navy, Washington, D.C.
[22] Filed: May 16, 1974
[21] Appl. No.: 470,415

[52] U.S. Cl. .................... 358/56; 178/7.6; 358/75
[51] Int. Cl.² .................... H04N 9/12; H04N 1/02
[58] Field of Search......... 358/56, 63, 75; 350/96 B, 350/96 WG; 178/DIG. 2, 7.6, 6; 250/236, 199

[56] References Cited
UNITED STATES PATENTS

| | | | |
|---|---|---|---|
| 3,130,263 | 4/1964 | Manning | 358/64 |
| 3,303,276 | 2/1967 | Haeff | 358/56 X |
| 3,475,552 | 10/1969 | Makino et al. | 178/7.6 |
| 3,507,984 | 4/1970 | Stavis | 358/63 |
| 3,549,800 | 12/1970 | Baker | 358/63 X |
| 3,619,484 | 11/1971 | Tanaka | 358/75 |

Primary Examiner—Robert L. Griffin
Assistant Examiner—Mitchell Saffian
Attorney, Agent, or Firm—Richard S. Sciascia; John W. Pease

[57] ABSTRACT

An improved multi-wavelength display system in which a multi-wavelength beam source or sources are employed in combination with a multitude of waveguides in groups, one group for each wavelength, with image data responsive modulators to directly modulate said multi-wavelength beams and with a common rotary waveguide scanning means to produce a multi-wavelength facsimile display which could be color television, infrared or microwave displays according to the selected source or sources.

6 Claims, 3 Drawing Figures

U.S. Patent  February 3, 1976  3,936,871
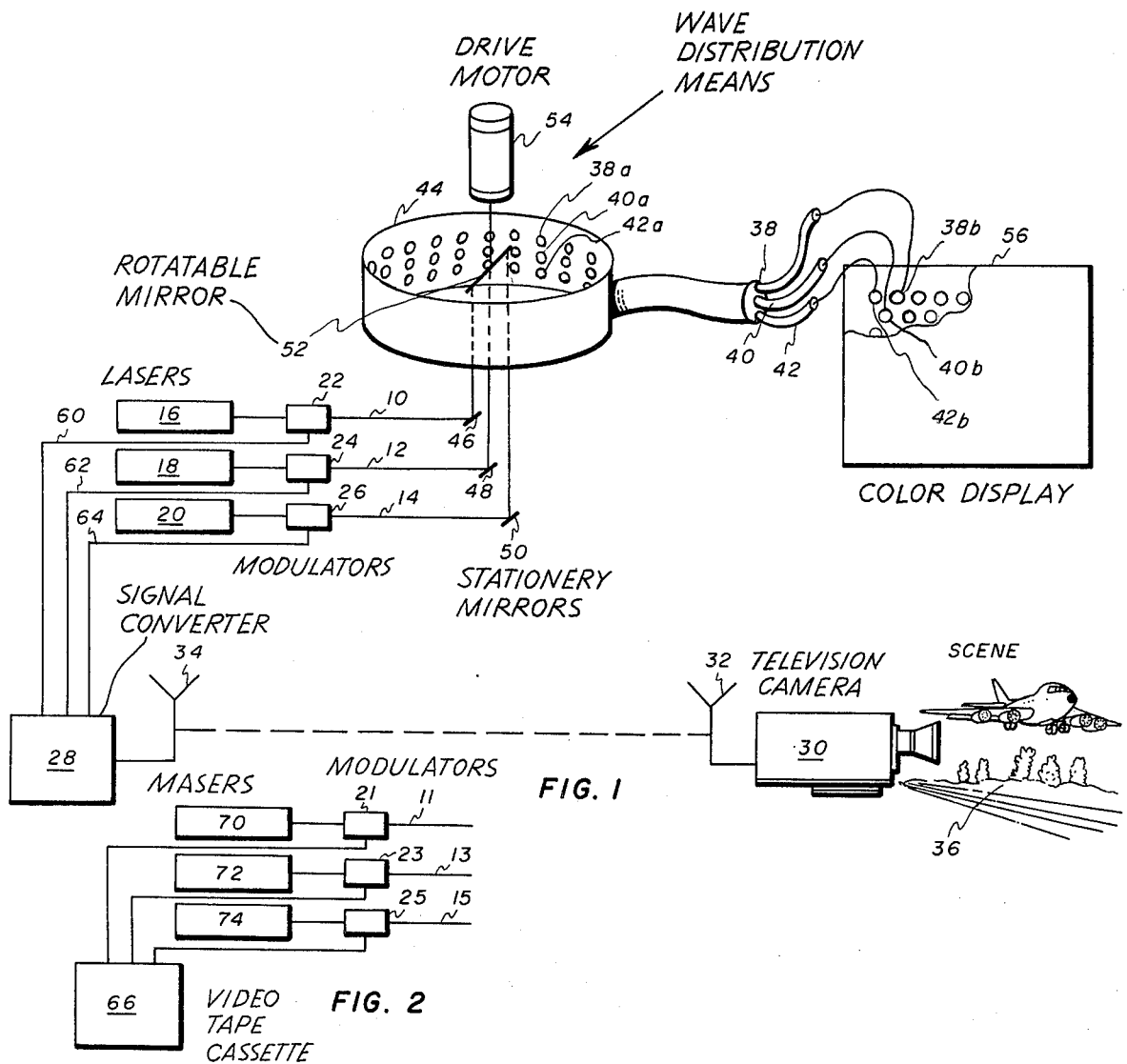
FIG. 1
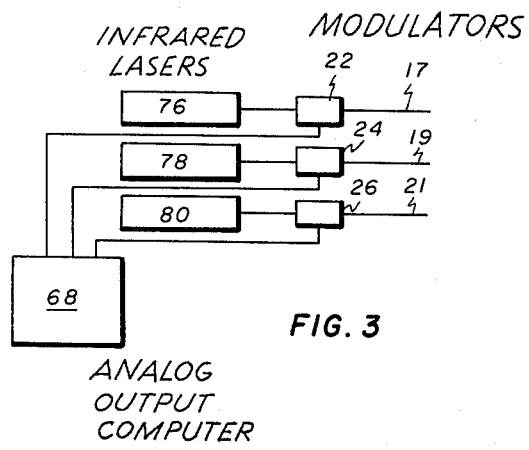
FIG. 2
FIG. 3

MULTI-WAVELENGTH DISPLAY SYSTEM

BACKGROUND OF THE INVENTION

The invention is in the field of optics, education and simulation and more narrowly in the field of projectors and image displays.

In the field of education, the use of simulation, using projectors, displays and other devices, is of ever increasing importance for reasons of time, economy and effectiveness. Display screens are of particular importance for the display of realistic environment and operational conditions. However, there are several areas in which image display and transfer and display means would benefit by improved techniques, if available. One example is in multi-color television displays.

Conventional multicolor televisions are accomplished by scanning electron beams across the screen, which is coated with various phosphors that emit the desired colors. The light emitted from the screen is not spectrally pure because the light produced by the phosphors has a very wide bandwidth. The light emitted by the screen is not coherent, and therefore cannot be used to carry other information besides intensity. The vertical resolution of the screen is commonly limited to about 0.01 inch because of the horizontal scan technique, and the order in which data points can be scanned is usually fixed because of the horizontal scan techniques.

State-of-the-art laser televisions are commonly implemented by scanning a modulated laser beam across a diffuse screen by means of acousto-optic deflectors, electro-optic deflectors, rotating mirror scanners, or piezoelectric scanners. These devices do provide spectrally pure colors and coherent output light. These devices do not increase the vertical resolution nor do they provide a random data point readout.

The subject invention provides an improved display, eliminating the disadvantages noted above while providing a simple, reliable, effective system of improved resolution, readability and brightness, the system being applicable not only to television displays but also to displays of images in the infrared and micro ranges of wavelength.

SUMMARY OF THE INVENTION

The invention contemplates a multi-wavelength display system in which a plurality of electro-magnetic radiation source means provide a plurality of beams of selected different wavelengths which are directly modulated in intensity by individual modulators receiving activating instructions from a programmable data input source and combined with a common reflector scan means, and groups of pluralities of waveguides having their input ends scanned by said common scan means and their outputs supported in a preselected arrangement to form, via said waveguide output ends, a display means. It is understood that electromagnetic radiation is defined to mean "radiation associated with a periodically varying electric and magnetic field that is traveling at the speed of light, including radio waves, light waves . . .," and hence includes light waves, infrared radiation waves and maser waves, which are the three types of waves with which this invention is concerned and which fall in the range of frequencies of $10^9$ to $10^{17}$ Hertz.

DESCRIPTION OF THE DRAWINGS

FIG. 1 is a schematic view partially in perspective of a multi-wavelength display system incorporating the invention; and FIGS. 2 and 3 are schematic views of modifications of a portion of FIG. 1 used to explain additional aspects of the invention.

DESCRIPTION OF THE PREFERRED EMBODIMENTS

Apparatus incorporating the invention in one preferred form is shown schematically in FIG. 1. The apparatus in FIG. 1 represents a color television display system in which, according to the invention, multi-colored laser beams 10, 12, 14 derived from respective lasers 16, 18, 20 are directly modulated by respective modulators 22, 24, 26 which receive data input from a frequency to voltage analog signal converter 28 such as a television receiver as described on pages 340–343 of *Television, How It Works*, 2nd Edition, by J. Richard Johnson, Rider Publishing Co., New York, 1956, Library of Congress Catalog Card No. 55-12539. The image signals may be applied to the converter from any suitable source, as for example from a video color camera 30 via the television transmitter and receiver antennae 32 and 34, as described on pages 334 – 340 of said publication, *Television, How It Works*, the camera 30 being directed to the image scene indicated at 36. The television camera 30 scans the scene 36 one horizontal line at a time by means of three independent color sensor systems and encodes this data for transmission, as described on pages 332 – 334 of said above-mentioned publication, *Television, How It Works*. A similar system is also described in U.S. Pat. No. 3,507,984, wherein the encoded transmission signal is used to drive three modulators which modulate three color laser beams.

The laser beams 10, 12 and 14, representing respectively the basic colors red, blue and green, and derived from the selected wavelength lasers 16, 18 and 20, are used in cooperative conjunction with three groups 38, 40, 42 of optic fibers having input ends 38a, 40a and 42a and output ends 38b, 40b and 42b.

To pass the laser beams 10, 12 and 14 as modulated to the input ends 38a, 40a and 42a of the respective optic fiber groups 38, 40 and 42, and electro-magnetic wave distribution means is provided. This distribution means includes a support 44, stationary mirrors 46, 48 and 50, and a rotatable mirror 52 driven by a motor 54 as described in FIG. 7a on page 363 of *Applied Optics and Optical Engineering*, Vol. 2, by Rudolf Kingslake, Academic Press, New York, 1965, Library of Congress Catalog Card No. 65-17761. In relation to the subject invention the term electromagnetic, used herein, refers to electromagnetic radiation which includes laser, maser and light rays, all of which fall in the parameters of $10^9$ to $10^{17}$ Hertz. Any suitable support means is provided which will hold the input ends of each group of optic fibers in sequential circular arrangement, directed inwardly toward a common center coinciding with the drive axis (indicated) of a rotatable mirror 52, each group in a plane parallel to its adjacent group. The stationary mirrors are positioned, each to pass beams from an associated laser to the rotatable mirror 52. The rotatable mirror is positioned, with respect to the optic fiber input ends, centrally and concentric therewith to redirect the laser beams from each laser source to an associated group of said input ends of the optic fibers in sequential manner as the rotatable mirror 52 is rotated by the motor 54. Thus, mirror 52 redirects beam 10 to sequentially scan optic fiber input ends 42a, redirects beam 12 to sequentially scan optic fiber ends 40a, and redirects beam 14 to sequentially scan optic fiber input ends 38a.

Suitable support means are also provided to hold the output ends 38b, 40b and 42b of said optic fibers in the conventional form of a color television display raster. The support means can be an apertured screen as indicated at 56, with holes through which the optic fiber output ends are passed to hold the ends in a desired array.

In operation the multicolor data, to be displayed on the screen 56 via the optic fiber output ends 38b, 40b and 42b, is entered via the data input element, which in the case of FIG. 1 is the television receiver converter 28, and passes on lines 60, 62 and 64 to the modulators 22, 24 and 26. The data input information in the form of analog voltages is used to vary the intensity and/or phase of the laser beams 10, 12 and 14. The image information carrying laser beams are directed by the stationary mirrors 46, 48 and 50 to the rotating mirror scanner 52. The mirror scanner 52 spins at any desired rate to redirect the modulates laser beams to the optic fiber input ends 38a, 40a and 42a situated each group in a circle about the rotating mirror 52 such that sequential scanning of the successive vertically arranged sets of fiber input ends, 38a, 40a and 42a constituting one set, results in a sequential scan of the corresponding sets of output ends 38b, 40b and 42b until a first horizontal raster line is scanned on display 56. Further rotation of the mirror 52 sequentially scans the remaining raster lines of the display 56 until the mirror completes the 360° circle and again starts to scan the first raster line. Each laser beam is presented to its associated group of optic fibers for providing the respective groups of red, blue and green lighted fibers. The output ends 38b, 40b and 42b of the optic fibers are arranged in a predetermined arrray of optic ends on the screen 56 corresponding to the common color picture tube dot array as described on pages 343–344 of the hereinbefore referenced publication, *Television, How It Works*.

It is to be understood that analog data input means in the case of the apparatus per FIG. 1 comprises the frequency to analog converter 28 which receives video signals transmitted from the TV camera 30. However, the analog data input means could also by any suitable programmed signal source for supplying analog voltages to the modulators, such as a common video tape cassette as is shown in FIG. 2 at 66, or an analog output computer such as is shown in FIG. 3 at 68.

It is to be noted also that the invention is not limited to television or video signals. For example, other electromagnetic radiation sources such as masers (70, 72, 74, FIG. 2) or infrared lasers (76, 78, 80, FIG. 3) could be used in place of visible lasers yielding video signals. The modulators for the infrared lasers would be the same as for FIG. 1, i.e., modulators 22, 24 and 26. The modulators for the maser beams 11, 13 and 15 are identified as 21, 23 and 25, and suitable examples are described at pages 182 to 184 of *Masers and Lasers* by M. Brotherton, McGraw-Hill Book Co., New York, 1964. The infrared laser beams in FIG. 3 are indicated at 17, 19 and 21.

The waveguide means could be micro-waveguides where masers are used, and the reflectors can be mirrors for use with visible light lasers and infrared lasers, and microwave reflectors for use with masers.

An infrared display (using infrared lasers) could be used for simulation of an infrared scene in infrared sniper-scope training equipment and on a classroom basis. An ultraviolet display could be used for training medical personnel in the use of Woods Light survey equipment for detecting skin diseases and disorders. A maser generated display could be used for training personnel in the use of radar scopes and associated equipments.

It is to be noted further that the lasers 16, 18 and 20 could be one multicolor laser with its colors sorted into components by dichroic mirrors or other suitable means. Also, additional optics can be introduced between the fixed mirrors 46, 48 and 50 and the rotatable mirror 52 to focus the laser beams onto the fiber optics input ends with less light loss. In the arrangement of the output ends of the fiber groups 38, 40 and 42, it is to be noted that the data (via data points established by the fiber display ends 38b, 40b and 42b) can be displayed on the screen in any desired predetermined order. The size of the individual strands of the optic fibers, being as small as 0.001 inch in diameter, is such that resolution as small as 0.001 inch can be obtained in both horizontal and vertical directions. In the case of maser sources, the micro-waveguides can be as small as 0.03 inch yielding a resolution limit of 0.03 inch horizontal and vertical.

Thus, advantages of the invention include the facts that (1) the light emitted by the display screen is bright, coherent and spectrally pure; (2) the resolution of the screen can be as small as 0.001 inch in both axes; (3) the data points on the screen can be displayed in any selected predetermined order; (4) the data input signal acts directly on the laser beams via the modulator means; and (5) the light emitted by the display screen can be of any wavelengths in the region of $10^9$ to $10^{17}$ hertz.

The several elements shown in block form are common off-the-shelf items presently available in commerce. For example, a suitable laser for elements 16, 18 and 20 is shown in the March 1974 issue of Laser Focus (inside front cover) and identified as Model 490, Tunable Dye Laser, by Coherent Radiation. For modulators 22, 24 and 26 a suitable element is Model M40–R, Acousto-Optic Light Modulator by Zenith Radio Corp., page 18 of the April 1974 issue of Laser Focus. For signal converter 28, a suitable element is a Television Receiver described on pages 1–4 of *Television, How It Works* by Richard Johnson, Rider Publishing Co., New York, 1956. In the same text, on pages 1–4 is described a television camera suitable for camera 30 and antennae 32 and 34. The video tape cassette 66 is the same as presently used by radio stations to record programs and is available from RCA Corp. Masers suitable for elements 70, 72 and 74 (FIG. 2) are described at pages 9-1ff of *Lectures on Physics*, Vol. III, by Richard Feynman, Addison Wesley Publishing, 1965. Lasers suitable for elements 76, 77 and 78 (FIG. 3) are such as Model 950A, Tunable $CO_2$ Laser by GTE Sylvania, referenced on page 50, April 1974 issue of Laser Focus mentioned above.

It will be understood that various changes in the details, materials and arrangements of parts, which have been herein described and illustrated in order to explain the nature of the invention, may be made by those skilled in the art, within the principle and scope of the invention as expressed in the appended claims.

What is claimed is:

1. A multi-wavelength display system comprising
   a. a plurality of electro-magnetic radiation source means, each of different wavelength and all within the frequency range of $10^9$ to $10^{17}$ cycles per second;
   b. an arrangement of groups of waveguides having input and output ends, one group for each radiation source;
   c. wave distribution means connected to pass radiation waves from each of said source means sequentially to the input ends of an associated group of said waveguides;
   d. support means and means forming on said support a raster type display formed of said output ends of said waveguides arranged in a pattern to provide horizontal and vertical scan from said wave distribution means;
   e. analog data input means for supplying voltage signals representative of an image and modulator means for receiving said input electrical signals to vary the intensity of radiation beam from each radiation source to reproduce on said display said image in radiation source wavelengths;
   said wave distribution means including
   f. means holding said input ends of each group of waveguides in sequential circular arrangement inwardly directed toward a common axial center, each group in a plane parallel to its adjacent group;
   g. reflector means including stationary reflectors and a rotatable reflector;
   h. said stationary reflectors being positioned each to pass waves from as associated radiation source to said rotatable reflector and said rotatable reflector being positioned, with respect to said wavelength input ends, centrally and concentric therewith to redirect radiation rays from each of said radiation source to an associated group of said input ends of said waveguide groups in sequential manner as said rotatable reflector is rotated; and
   i. means for rotating said rotatable reflector at a speed selected to provide a desired raster scan rate.

2. Apparatus according to claim 1, in which
   a. said electromagnetic radiation sources are visible light lasers;
   b. said waveguides are optic fibers as small as 0.001 inch diameter; and
   c. said reflectors are mirrors to provide a resultant display of coherent and spectrally pure light and of resolution as small as 0.001 inch.

3. Apparatus according to claim 1, in which
   a. said electromagnetic radiation sources are masers;
   b. said waveguides are micro-waveguides as small as 0.03 inch diameter;
   c. said reflectors are microwave reflectors to provide a resultant display of coherent and spectrally pure microwaves and of resolution as small as 0.03 inch.

4. Apparatus according to claim 1, in which
   a. said electromagnetic radiation sources are infrared lasers;
   b. said waveguides are optic fibers as small as 0.001 inch in diameter; and
   c. said reflectors are mirrors to provide a resultant display of coherent and spectrally pure infrared light and of resolution as small as 0.001 inch.

5. Apparatus according to claim 1, in which
   a. said data input means is a frequency to voltage analog signal converter for receiving color television signal inputs from a source of television image signals and passing analog signals to said modulators to pass and/or modulate the intensity of the radiation beams from each of said radiation sources.

6. Apparatus according to claim 1, in which
   a. said data input means is a programmed signal source for supplying analog voltage to said modulators to pass and/or modulate the intensity of the radiation beams from each of said radiation sources.

* * * * *